United States Patent
Gamez et al.

(10) Patent No.: US 10,670,168 B2
(45) Date of Patent: Jun. 2, 2020

(54) CONDUIT TILE HOOK

(71) Applicant: Mycrogrid Electric Corp., Palm Desert, CA (US)

(72) Inventors: Isaac Jorge Gamez, Palm Desert, CA (US); Matthew Christopher De La Torre, Palm Desert, CA (US)

(73) Assignee: MYCROGRID ELECTRIC CORP., Palm Desert, CA (US)

( * ) Notice: Subject to any disclaimer, the term of this patent is extended or adjusted under 35 U.S.C. 154(b) by 0 days.

(21) Appl. No.: 16/022,234

(22) Filed: Jun. 28, 2018

(65) Prior Publication Data

US 2018/0306349 A1     Oct. 25, 2018

Related U.S. Application Data

(63) Continuation of application No. 15/486,132, filed on Apr. 12, 2017, now abandoned.

(60) Provisional application No. 62/437,604, filed on Dec. 21, 2016.

(51) Int. Cl.
| *F16L 3/06* | (2006.01) |
| *E04D 1/12* | (2006.01) |
| *H02S 20/23* | (2014.01) |
| *F24S 25/613* | (2018.01) |
| *F16L 3/04* | (2006.01) |

(52) U.S. Cl.
CPC ............... *F16L 3/06* (2013.01); *E04D 1/12* (2013.01); *F16L 3/04* (2013.01); *F24S 25/613* (2018.05); *H02S 20/23* (2014.12)

(58) Field of Classification Search
CPC ..... F16L 3/06; F16L 3/04; F16L 3/137; F16L 3/1215; F16L 3/2235; F16L 3/10; F16L 3/237; F24S 25/613; H02S 20/23; F16B 2/065
USPC ............... 248/692, 237, 300, 301, 304, 339; 52/90.2
See application file for complete search history.

(56) References Cited

U.S. PATENT DOCUMENTS

| 240,736 A | 4/1881 | Leeds |
| 2,855,107 A | 10/1958 | Roth |
| 3,181,827 A | 5/1965 | Sassin |
| 3,307,811 A | 3/1967 | Anderson |
| 3,792,852 A * | 2/1974 | Reniker ............... E04F 21/1855 248/237 |
| 4,517,776 A | 5/1985 | Barker |
| 5,398,476 A | 3/1995 | Knight |

(Continued)

FOREIGN PATENT DOCUMENTS

WO       2015039007 A2       3/2015

OTHER PUBLICATIONS

Office Action dated Sep. 12, 2017 in U.S. Appl. No. 15/486,132.

(Continued)

*Primary Examiner* — Terrell L McKinnon
*Assistant Examiner* — Michael McDuffie
(74) *Attorney, Agent, or Firm* — Vierra Magen Marcus LLP

(57) ABSTRACT

A Conduit Tile Hook is disclosed for supporting a conduit above a roof. The Conduit Tile Hook simply slides under an existing roof tile, without cut-outs or removing any nails, and allows the conduit to sit 1.5" off of the roof surface to decrease the effects of heating caused by solar irradiance.

15 Claims, 8 Drawing Sheets

(56) References Cited

U.S. PATENT DOCUMENTS

| | | | | |
|---|---|---|---|---|
| 5,465,499 | A * | 11/1995 | LaPlante | E04F 21/1855 269/904 |
| 5,669,184 | A * | 9/1997 | Anderson | E04D 13/10 52/24 |
| 5,887,831 | A | 3/1999 | Post | |
| 6,168,125 | B1 * | 1/2001 | Winger | A47G 7/044 248/228.3 |
| 7,195,218 | B2 | 3/2007 | James et al. | |
| 7,941,989 | B2 | 5/2011 | Morsching | |
| 8,356,778 | B2 | 1/2013 | Birli et al. | |
| 8,555,569 | B2 | 10/2013 | Crasnianski | |
| 8,584,419 | B2 | 11/2013 | Dodge, Sr. et al. | |
| 8,839,575 | B1 | 9/2014 | Liu et al. | |
| 8,979,043 | B2 | 3/2015 | Florman | |
| 9,010,038 | B1 * | 4/2015 | Stearns | E04D 13/00 52/173.1 |
| 9,428,903 | B2 | 8/2016 | West et al. | |
| 9,435,568 | B2 | 9/2016 | Smidt et al. | |
| 10,202,991 | B2 * | 2/2019 | Lewis | F16L 3/1233 |
| 10,236,821 | B1 * | 3/2019 | Atia | F24S 25/33 |
| 2003/0042374 | A1 | 3/2003 | Johnson et al. | |
| 2004/0169115 | A1 | 9/2004 | Glenn et al. | |
| 2005/0072091 | A1 * | 4/2005 | Morris | E04B 7/205 52/518 |
| 2007/0144105 | A1 | 6/2007 | Blanchard | |
| 2009/0044854 | A1 | 2/2009 | Placer et al. | |
| 2009/0173844 | A1 | 7/2009 | Huo | |
| 2009/0218453 | A1 | 9/2009 | Brenner | |
| 2010/0320343 | A1 * | 12/2010 | Beck | H02S 20/23 248/226.11 |
| 2014/0339387 | A1 | 11/2014 | Bolze et al. | |
| 2016/0054030 | A1 | 2/2016 | Ilzhofer | |
| 2016/0105143 | A1 | 4/2016 | Johansen | |

OTHER PUBLICATIONS

Response to Office Action filed Feb. 12, 2018 in U.S. Appl. No. 15/486,132.

Final Office Action dated Mar. 28, 2018 in U.S. Appl. No. 15/486,132.

* cited by examiner

Figure 1A
Figure 1B
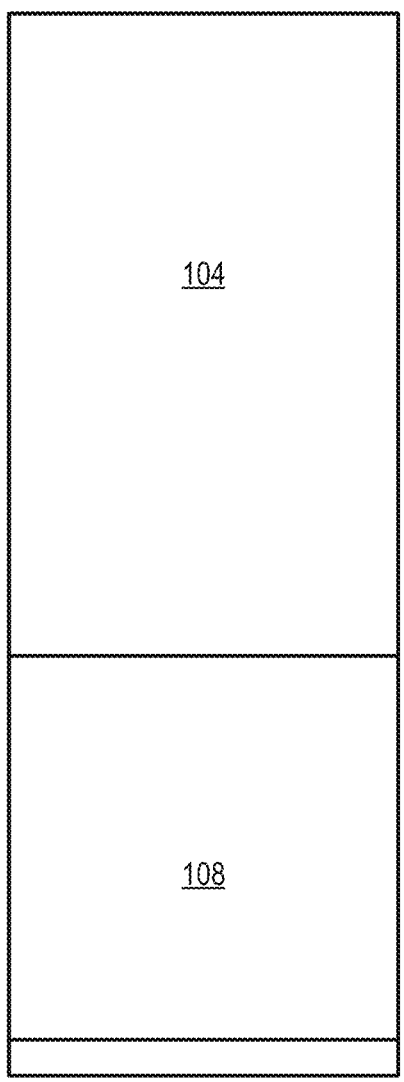
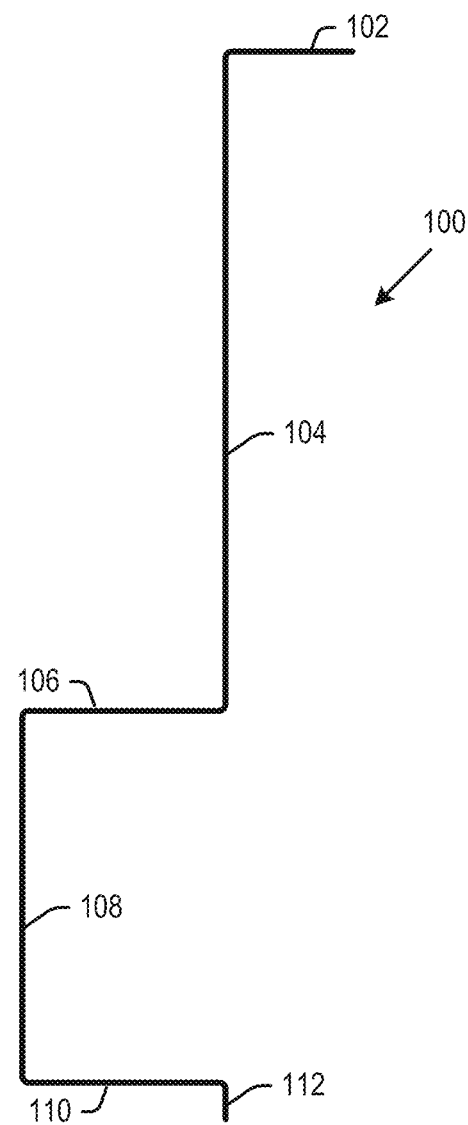

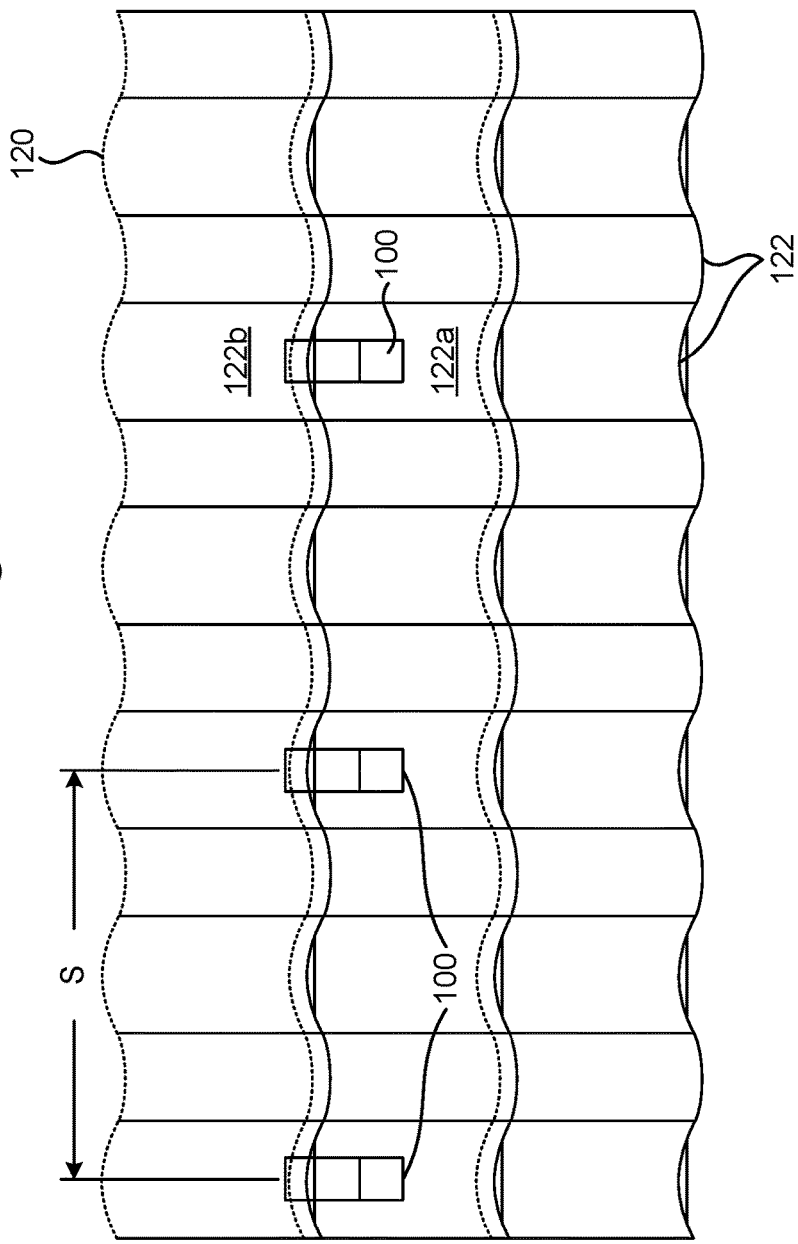
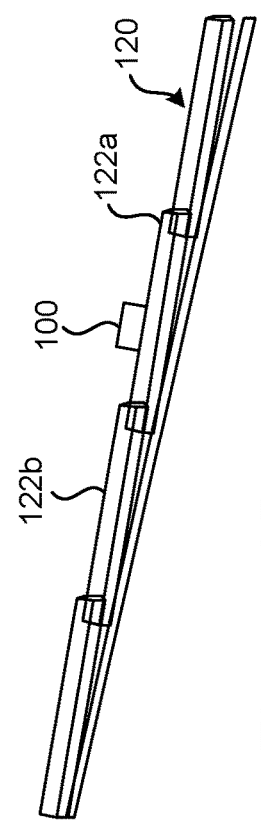

CONDUIT TILE HOOK

PRIORITY CLAIM

The present application is a continuation of U.S. patent application Ser. No. 15/486,132, entitled "Conduit Tile Hook," filed on Apr. 12, 2017, which application claims priority to U.S. Provisional Patent Application No. 62/437,604, entitled "Conduit Tile Hook," filed on Dec. 21, 2016, which applications are incorporated herein by reference in their entirety.

BACKGROUND

When installing solar photovoltaic (PV) systems on tilted rooftops, there is a portion of the project that lacked in aesthetics and integrity. The method of installing the conduit to house the conductors that run from the solar PV modules down to the electrical panel seemed a bit rudimentary. In particular, the process involves gluing sawed-off pieces of 2×4 wood studs to the tile and mounting the electrical conduit to these studs. This method was not the most efficient as wood is not a typical item found in most electrical warehouses and requires a separate trip to a home improvement store, or lumber yard. The time it takes to transport, cut, and glue pieces of wood to the tile also slows down the installation, as this must be done prior to the actual installation of the conduit so that the glue can dry. The intent of the wood pieces was to give the conduit a flat surface so that it can be screwed down without penetrating the roof or tile, while at the same time giving sufficient physical space between the roof surface and conduit. The 1½" gap between the roof and conduit diminishes the heat effects of the sun shining on a roof. Per NEC 2014 Table 310.15(B)(3)(c), conduits that have at least 1½" space above the roof, rather than being mounted flush on the roof, reduce the overall temperature of the conductors by 20 degrees. This is significant when determining the size of the conductors and efficiency of the overall system. With this in mind, there is a need for a better, easier and overall more aesthetically pleasing method of installing conduit on tile roofs.

BRIEF DESCRIPTION OF THE DRAWINGS

FIGS. 1A and 1B are top and edge views of the Conduit Tile Hook.

FIGS. 3A and 3B are top and edge views of the Conduit Tile Hook installed on a Spanish tile roof.

FIG. 4 is an illustration of the Conduit Tile Hook installed by lifting up the tile above it and hooking it onto the tile its sits on top of.

DETAILED DESCRIPTION

The Mycrogrid Conduit Tile Hook will effectively and efficiently allow installers to mount conduit on a tilted Spanish tile or flat tile roof with an adequate distance off of the roof surface to minimize overheating caused by exposure to sunlight. The Conduit Tile Hook is quick and easy to install, with no moving parts or additional hardware.

The terms "top" and "bottom," "upper" and "lower" and "vertical" and "horizontal" as may be used herein are by way of example and illustrative purposes only, and are not meant to limit the description of the technology inasmuch as the referenced item can be exchanged in position and orientation. Also, as used herein, the terms "substantially," "approximately" and/or "about" mean that the specified dimension or parameter may be varied within an acceptable manufacturing tolerance for a given application. In one embodiment, the acceptable manufacturing tolerance is ±0.25%.

Figure 2:
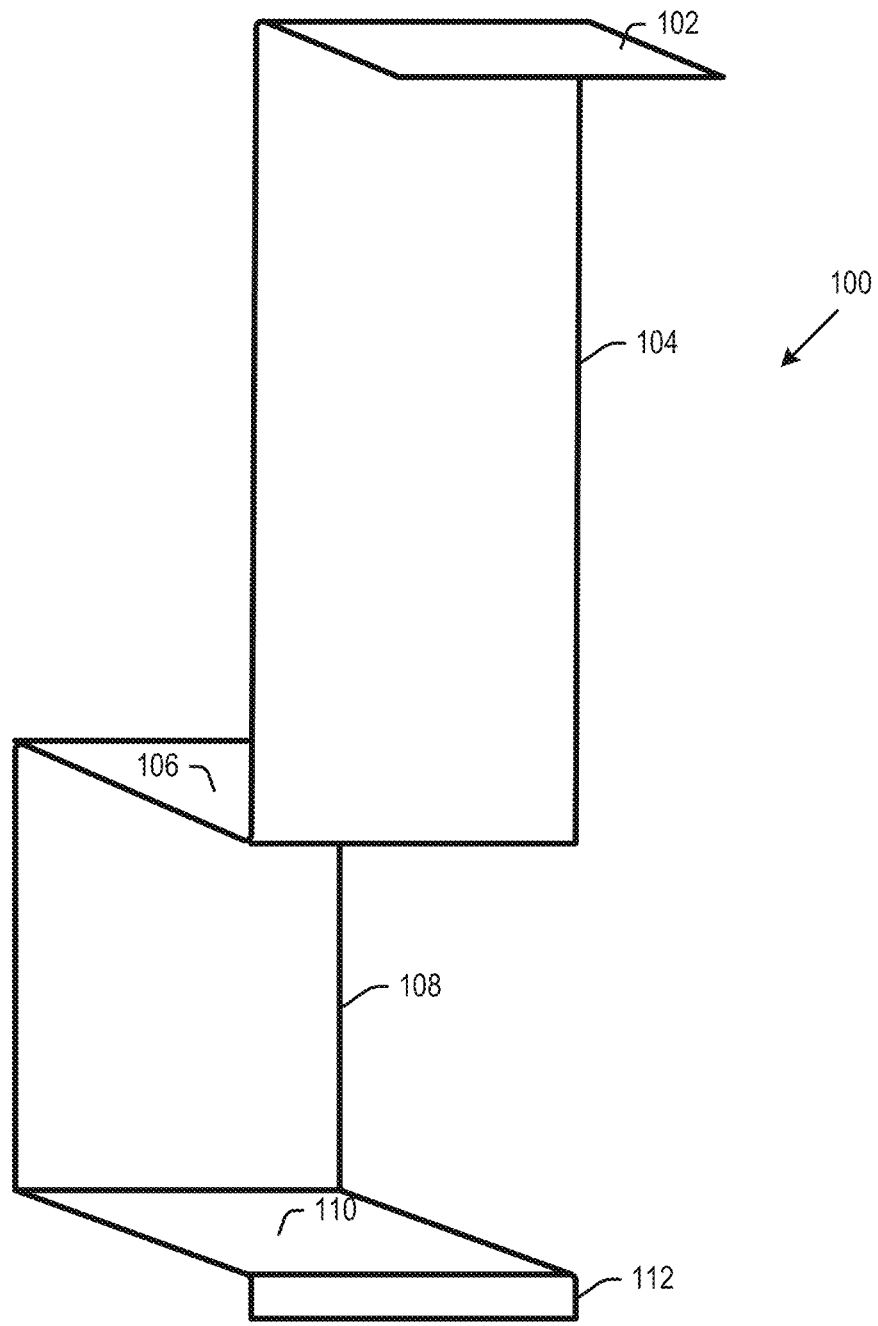
FIG. 2 is a perspective view of the Conduit Tile Hook.

FIGS. 1A-2 illustrate top, edge and perspective views of a tile hook 100 which may be used on a variety of roofs for supporting a conduit spaced away from the roof. The tile hook 100 may be affixed to a roof without the use of glue, as glue is not reliable for a system that is meant to operate for 20 years or more. As explained below, the tile hook is configured to both hold onto the end of a tile and be held down by the tile on top of it. This does not require any penetrations into the roof, nor any penetrations or cut-outs from the existing tiles, which avoids any possible roof leaks in the future. The Conduit Tile Hook allows the conduit to sit 1.5" off of the roof surface to decrease the effects of heating caused by solar irradiance. The Conduit Tile Hook may be made up of a ⅛" thick aluminum 6063 alloy with a T5 temper. The finish on the material is anodized to help eliminate deterioration due to direct sunlight. The Conduit Tile Hook may be formed of other materials in further embodiments, including for example stainless steel, carbon fiber or other durable materials.

The Conduit Tile Hook is created through an aluminum extrusion plant that produces the material in 8 foot lengths. The Conduit Tile Hook may be produced by other methods, including for example casting and 3D printing. After delivery, the Conduit Tile Hooks can be cut to any width necessary. Typically, they are cut in 3" sections (width dimension), as this is most common and convenient size for Spanish and flat tile roofs. However, the Conduit Tile Hook can be made to be as wide as necessary. Overall, the Conduit Tile Hook will decrease installation time and costs, while increasing the life span and durability of an installation.

Once the extruded aluminum is cut to the desired length and width, the aluminum may be bent into a shape forming the finished conduit tile hook 100. As shown in FIGS. 1B and 2, the tile hook 100 may be bent into a plurality of planar sections. A first planar section 102 is used to hook onto the edge of a roof tile, as explained below. The first planar section may also be referred to herein as a hook section. In embodiments, the first planar section 102 may have a length of 0.875 inches, though it may be longer or shorter than that in further embodiments. The tile hook 100 may have a second planar section 104 extending from the first planar section 102, for example at a 90 degree bend. In embodiments, the second planar section 104 may have a length of 4.25 inches, though it may be longer or shorter than that in further embodiments. The tile hook 100 may have a third planar section 106 extending from the second planar section 104, for example at a 90 degree bend. In embodiments, the third planar section 106 may have a length of 1.5 inches, though it may be longer or shorter than that in further embodiments. The tile hook 100 may have a fourth planar section 108 extending from the third planar section 106, for example at a 90 degree bend. The fourth planar section may also be referred to herein as a raised section. In embodiments, the fourth planar section 108 may have a length of 2.5 inches, though it may be longer or shorter than that in further embodiments. The tile hook 100 may have a fifth planar section 110 extending from the fourth planar section 108, for example at a 90 degree bend. In embodiments, the fourth planar section 108 may have a length of 1.5 inches, though it may be longer or shorter than that in further embodiments. The tile hook 100 may have a sixth planar section 112 extending from the fifth planar section 110, for example at a 90 degree bend. In embodiments, the sixth planar section 112 may have a length of 0.25 inches, though it may be longer or shorter than that in further embodiments.

The third planar section 106 and the fifth planar section 110 are used to space the fourth planar section 108 away from the roof. A conduit may be supported on the fourth planar section as explained below. The third planar section 106 and the fifth planar section 110 preferably have the same length so that the second section 102 and sixth section 112 may be coplanar with each other. The sixth section 112 is used to support an end of the tile hook 100 on a roof. It is possible that the sixth section 112 be omitted in further embodiments, so that the end of the fifth section supports the end of the tile hook 100 on the roof. The overall length of a tile hook 100 may be 7.0 inches, though it may be longer or shorter than that in further embodiments.

FIGS. 3A and 3B illustrate tile hook 100 installed on a roof 120 formed for example of Spanish tiles 122. An electrical conduit (not shown) may be provided laterally (left to right from the perspective of FIG. 3A). As such, a plurality of tile hooks 100 may be mounted along the same row of tiles 122 to support the electrical conduit spaced away from the roof 120. In embodiments, tile hooks 100 for supporting a length of electrical conduit may be spaced from each other a spacing, S, of up to 10 feet, though this spacing may be more or less and that in further embodiments. As seen for example in FIG. 3B, in order to install a tile hook 100 on a given tile 122a, an end of the tile hook 100 including the first planar section 102 is slid under a tile (122b) of the next higher row of tiles until the first planar section hooks onto the front edge of the tile 122a (beneath tile 122b). At this point, the tile hook 100 is completely installed. The Conduit Tile Hook simply slides under the existing tile, without cut-outs or removing any nails, and allows the electrical conduit to sit on the fourth planar section 108 a distance such as 1.5" off of the roof surface to decrease the effects of heating caused by solar irradiance.

As noted above, the lengths of the third and fifth planar sections 106 and 110 may be 1.5" to space the electrical conduit off of the roof 1.5". In one further embodiment, the lengths of the third and fifth planar sections 106 and 110 may be 3.0" to space the electrical conduit off of the roof 3". It is understood that lengths of the third and fifth planar sections may be any length between 1.5" and 3" in further embodiments, or longer than 3" or shorter than 1.5" in further embodiments. The length of the second planar section 104 is provided so that the first planar section 102 may hook on the edge of a tile 122a and the third, fourth and fifth planar sections 106, 108 and 110 rest on a surface of the tile 122a, spaced away from the tile 122b of the next adjacent level.

Figure 4:
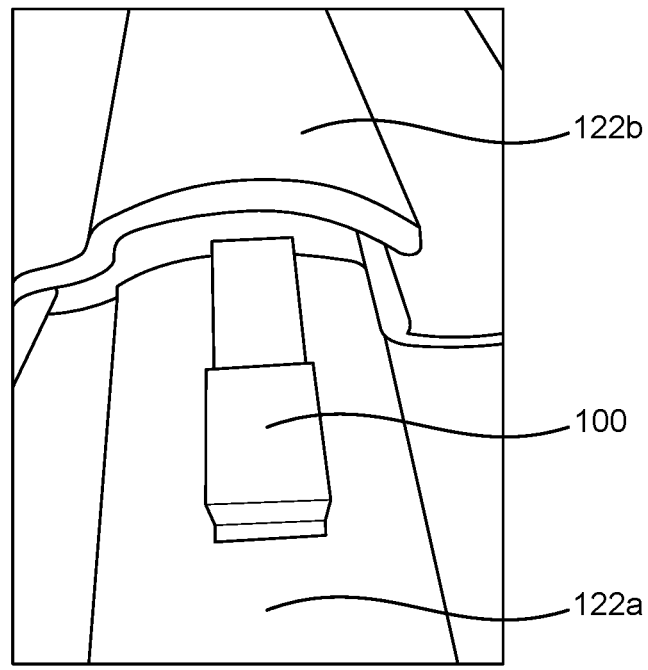
Figure 5:
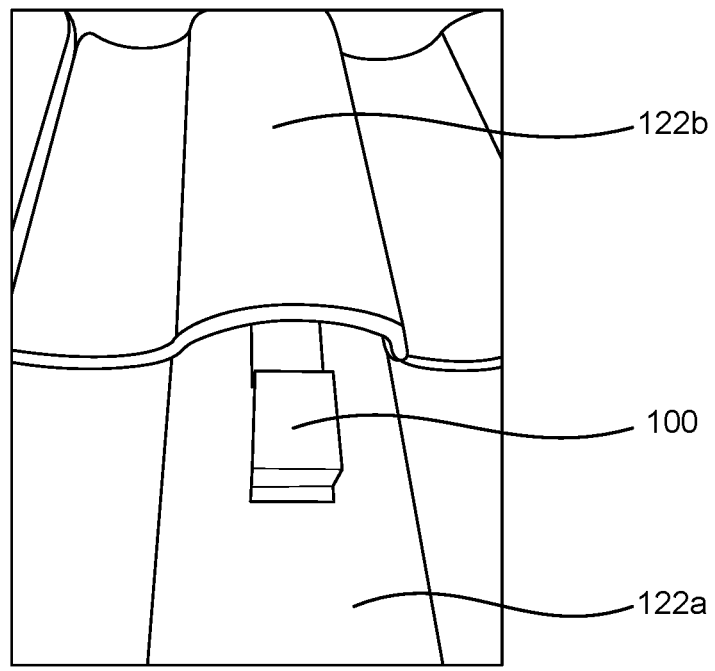
FIG. 5 is an illustration of the Conduit Tile Hook after installation.
Figure 6:
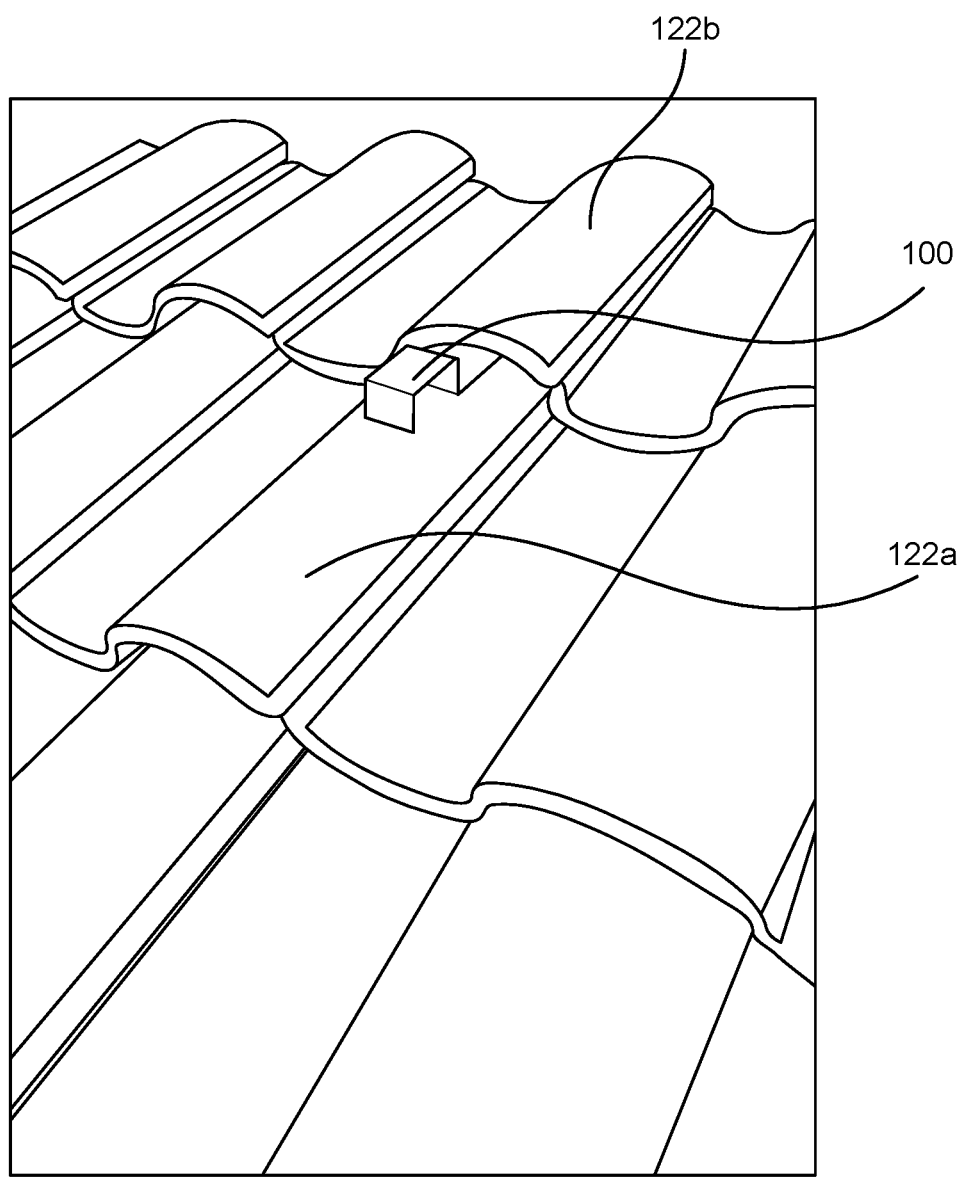
FIG. 6 is an illustration of the Conduit Tile Hook after installation.

As shown in FIG. 4, in order to slide a tile hook 100 under the tile 122b of the next adjacent row of tiles 122, the tile 122b may be lifted slightly from its home position. Once the first planar section 102 hooks on the edge of the tile 122a, the tile 122b may be returned to its home position as shown in FIGS. 5 and 6. The tile 122b maintains the tile hook in a secure position on the tile 122a. Upon installation, the tile hook 100 is securely affixed to the tile 122a without affecting the home position of the tile 122b in the above-adjacent row of tiles.

Figure 7:
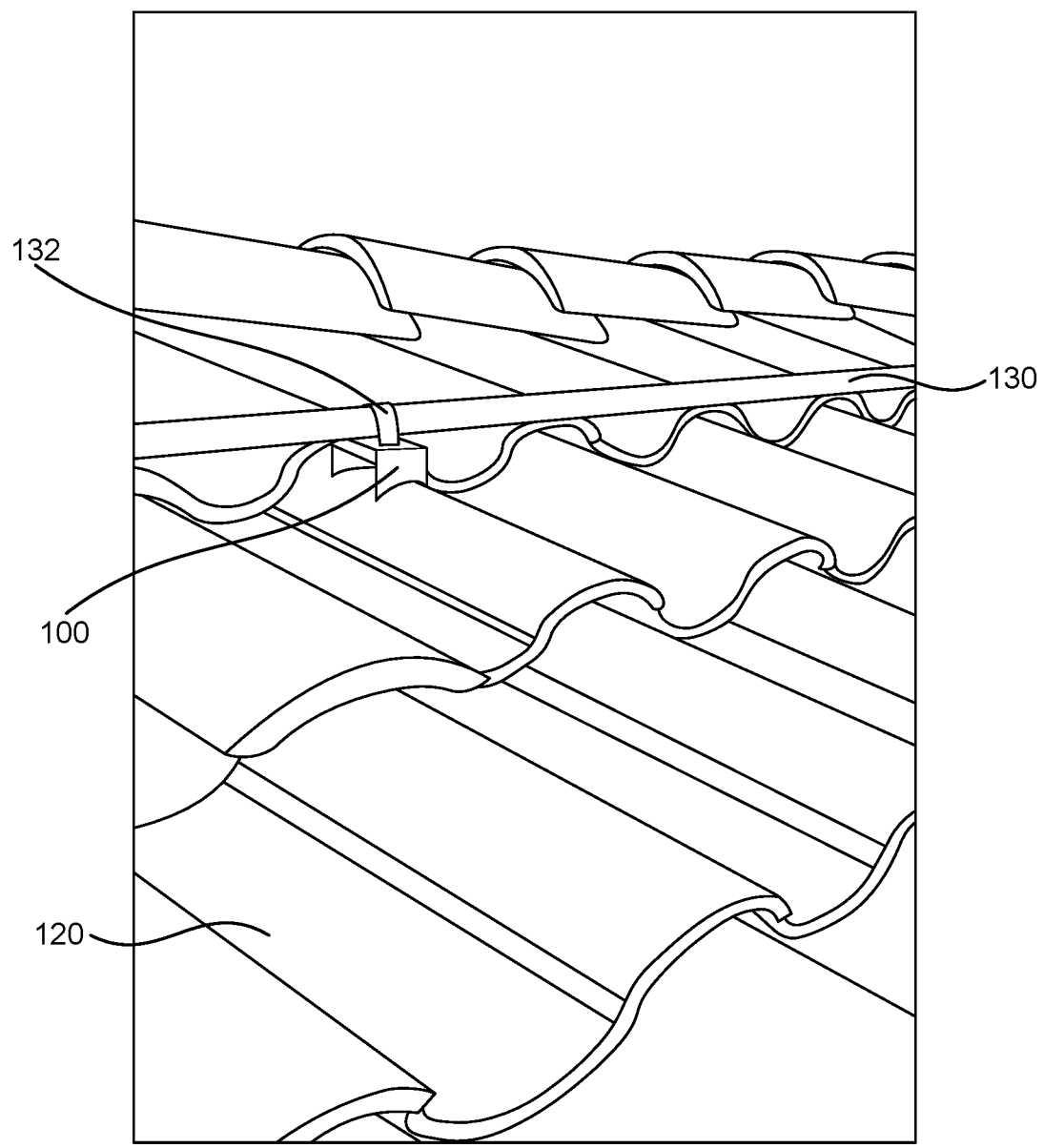
FIG. 7 is an illustration of the Conduit Tile Hook installed with conduit mounted.
Figure 8:
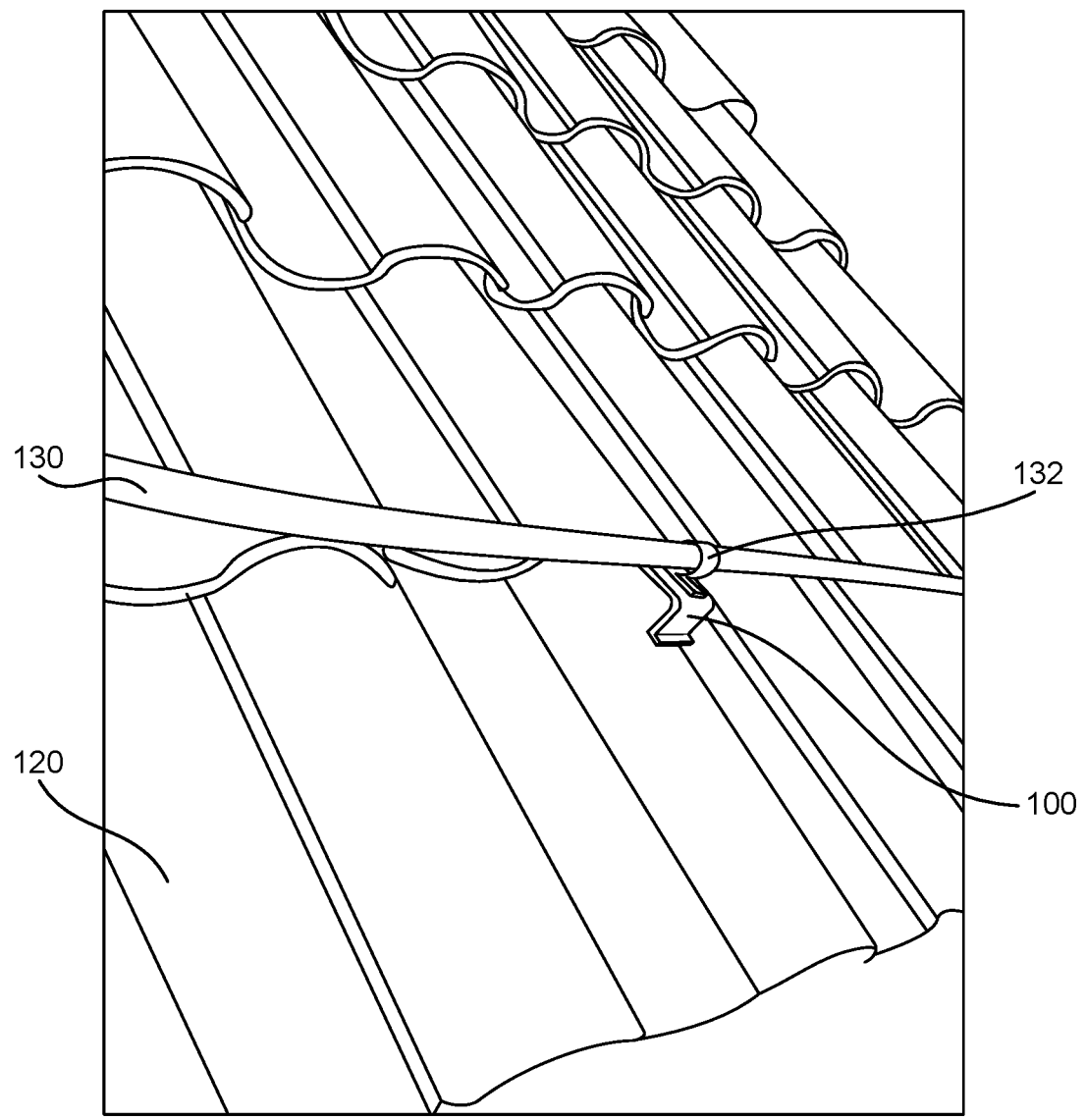
FIG. 8 is an illustration of the Conduit Tile Hook installed with conduit mounted.

FIGS. 7 and 8 illustrate an electrical conduit 130 mounted on tile hook 100 on a roof 120. The conduit 130 may be affixed to a tile hook 100 using a bracket 132 which fits over the electrical conduit 130 and screws down into holes formed in the fourth planar section 108 of tile hook 100. The bracket 132 may be affixed to a tile hook 100 before mounting on roof 120. In this instance, the tile hook 100 and bracket 132 may be slid over an end of a section of electrical conduit 130, positioned as desired and mounted onto a tile 122. Alternatively, a tile hook 100 may be affixed onto a tile 122, the electrical conduit 130 positioned on the fourth planar section 108, and the bracket 132 then affixed to secure the conduit 130 to the tile hook 100. It is understood that fasteners other than bracket 132 may be used to affix an electrical conduit 130 to the fourth planar section 108 of the tile hook 100.

Figure 9A:
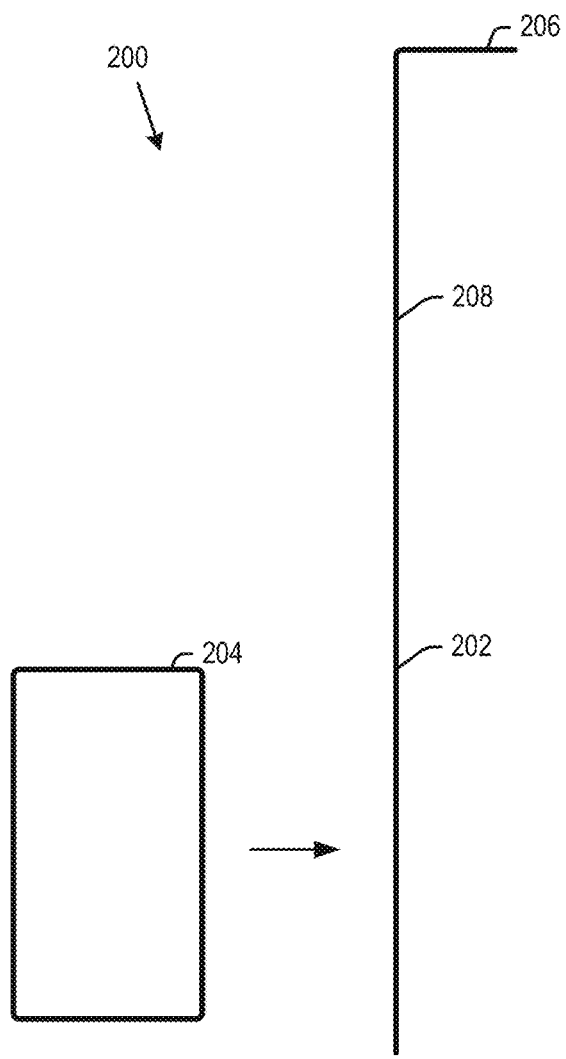
FIGS. 9A and 9B are edge views of an alternative embodiment of the Conduit Tile hook.
Figure 9B:
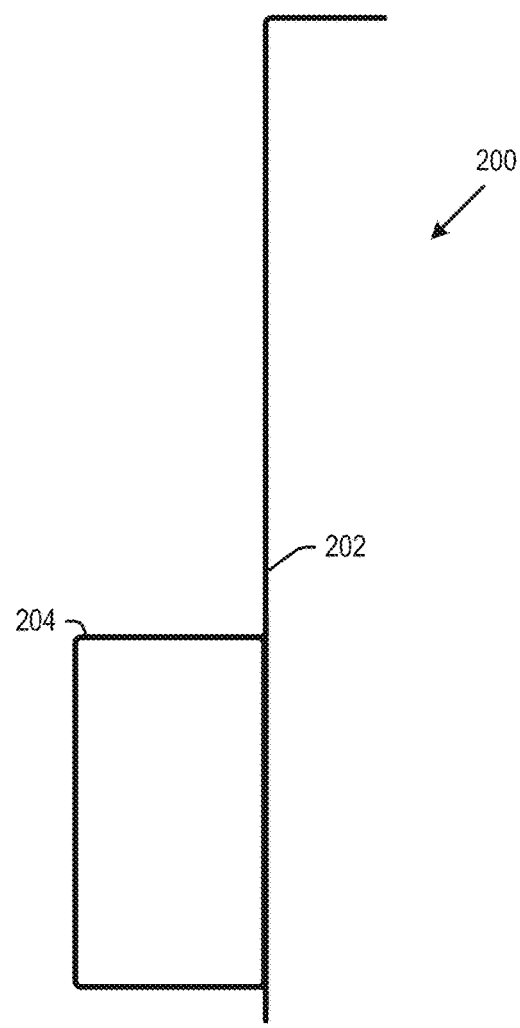

FIGS. 9A and 9B show a further embodiment of the present technology including a tile hook 200 having a first portion 202 and a second portion 204. The first portion 202 may have a first planar section 206 (identical to first planar section 102), and a second planar section 208 extending the entire length of the tile hook 200. The second planar section 208 may be integrally formed with the first planar section 206, and extend therefrom at an angle such as 90 degrees. The second portion 204 may be a quadrilateral shaped piece of material which is affixed to the first portion 202, as by screws, welding, gluing or other affixation methods. The second portion 204 may be a solid block or hollow. The materials of the first and second portions may both be anodized aluminum, but may be other materials in further embodiments, and the first and second portions may be the same or different materials. The second portion 204 may be sized and positioned to match the third, fourth and fifth planar sections 106, 108 and 110 described above.

The Conduit Tile Hook of the present technology, has several advantages, including replacing the installation of 2"×4" wood segments that are held down with glue which could deteriorate over time and lose integrity. The Conduit Tile Hook will also decrease installation time and costs, while increasing the life span and durability of an installation.

In summary, an example of the present technology relates to an apparatus, comprising: a conduit tile hook for supporting a conduit above a roof, the conduit tile hook comprising: a hook section configured to hook onto a front edge of a roof tile; a second section extending from the hook section; and a raised section in a fixed relation to the second section, the raised section being at a different elevation relative to the second section, and the raised section configured to support the conduit above the roof.

In another example, the present technology relates to a conduit tile hook for supporting a conduit above a roof, the conduit tile hook comprising: a first section configured to hook onto a front edge of a roof tile; a second section extending from the first section at an angle; a third section extending from the second section at an angle; a fourth section extending from the third section at an angle, the fourth section configured to support the conduit above the roof; and a firth section extending from the fourth section at an angle.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology and its practical application to thereby enable others skilled in the art to best utilize the technology in various embodiments and with various modifications as are suited to the particular use contemplated. It is intended that the scope of the technology be defined by the claims appended hereto.

What is claimed is:

1. An apparatus for being supported on a roof tile of a roof, the roof tile comprising a front edge and a rear edge, the front edge being nearer a top of the roof than the rear edge, the roof tile further comprising a first surface between the front and rear edges and a second surface opposite the first surface between the front and rear edges, the second surface of the roof tile facing the roof, the apparatus comprising:
   a conduit tile hook for supporting a conduit above the roof, the conduit tile hook comprising:
      a first planar section configured to hook onto the front edge of the roof tile;
      a second planar section formed together with the first planar section and extending from the first planar section, the second section configured to lie along the first surface of the roof tile, parallel to the first surface of the roof tile, after hooking of the first planar section on the front edge of the roof tile;
      a third planar section formed together with the second planar section and extending from the second planar section, the third planar section configured to extend up away from the roof tile;
      a fourth planar section formed together with the third planar section and extending from the third planar section, the fourth planar section configured to support a conduit above the roof;
      a fifth planar section formed together with the fourth planar section and extending from the fourth planar section, the fifth planar section configured to extend down toward the roof tile; and
      a sixth planar section formed together with the fifth planar section and extending from the fifth planar section, the sixth planar section defining an end of the conduit tile hook such that no portions of the conduit tile hook extend beyond the sixth planar section, the sixth planar section configured to be supported on the first surface of the roof tile, and the sixth planar section being parallel to the second planar section.

2. The apparatus of claim 1, wherein the second planar section extends from the first planar section at a 90 degree angle.

3. The apparatus of claim 1, wherein the fifth planar section is elevated 1.5 inches with respect to the second planar section.

4. The apparatus of claim 1, wherein the fifth planar section is elevated 3 inches with respect to the second planar section.

5. The apparatus of claim 1, wherein the conduit tile hook is formed of aluminum.

6. The apparatus of claim 5, wherein aluminum conduit tile hook has an anodized finish.

7. A conduit tile hook for supporting a conduit above a first roof tile of a roof, the first roof tile comprising a front edge and a rear edge, the front edge being nearer a top of the roof than the rear edge, the first roof tile further comprising a first surface between the front and rear edges and a second surface opposite the first surface between the front and rear edges, the second surface of the first roof tile facing the roof, the conduit tile hook comprising:
   a first section configured to hook onto the front edge of the first roof tile that is covered by a portion of a second roof tile to secure the tile hook on the first roof tile, and
   a second section integrally formed with, and extending from, the first section at an angle such that the second section lies along the first surface of the roof tile upon the first section hooking onto the front edge of the roof tile;
   a third section configured to extend from the second section at an angle up away from the roof;
   a fourth section extending from the third section at an angle, the fourth section raised relative to the first roof tile and configured to support the conduit above the roof;
   a fifth section extending from the fourth section at an angle toward the roof;
   a sixth section extending from the fifth section, the sixth section defining an end of the conduit tile hook such that no portions of the conduit tile hook extend beyond the sixth planar section, the sixth section configured to be supported on the first surface of the roof tile and the sixth section being parallel to the second section.

8. The conduit tile hook of claim 7, wherein second section extends from the first section at a 90 degree angle.

9. The conduit tile hook of claim 7, wherein third and fifth sections have the same length.

10. The conduit tile hook of claim 7, wherein the third section extends from the second section at a 90 degree angle, the fourth section extends from the third section at a 90 degree angle, and the fifth section extends from the fourth section at a 90 degree angle.

11. The conduit tile hook of claim 7, wherein the third and fifth sections space the fourth section above the second section by a distance of 1.5 inches.

12. The conduit tile hook of claim 7, wherein the third and fifth sections space the fourth section above the second section by a distance of 3 inches.

13. The conduit tile hook of claim 7, wherein the conduit tile hook is formed of aluminum.

14. The conduit tile hook of claim 13, wherein aluminum conduit tile hook has an anodized finish.

15. An apparatus for being supported on a roof tile of a roof, the roof tile comprising a front edge and a rear edge, the front edge being nearer a top of the roof than the rear edge, the roof tile further comprising a first surface between the front and rear edges and a second surface opposite the first surface between the front and rear edges, the second surface of the roof tile facing the roof, the apparatus comprising:
   a conduit tile hook for supporting a conduit above the roof, the conduit tile hook comprising:
      a first planar section configured to hook onto the front edge of the roof tile;
      a second planar section formed together with the first planar section and extending from the first planar section, the second section configured to lie along the first surface of the roof tile, parallel to the first surface of the roof tile, after hooking of the first planar section on the front edge of the roof tile;
      a third planar section formed together with the second planar section and extending from the second planar section, the third planar section configured to extend up away from the roof tile;

a fourth planar section formed together with the third planar section and extending from the third planar section, the fourth planar section configured to support a conduit above the roof;

a fifth planar section formed together with the fourth planar section and extending from the fourth planar section, the fifth planar section configured to extend down toward the roof tile and into contact with the first surface of the roof tile, the fifth planar section defining an end of the conduit tile hook such that no portions of the conduit tile hook extend beyond the fifth planar section.

* * * * *